(12) United States Patent
Pizzoli et al.

(10) Patent No.: US 8,171,460 B2
(45) Date of Patent: May 1, 2012

(54) SYSTEM AND METHOD FOR USER INTERFACE AUTOMATION

(75) Inventors: Simon Pizzoli, Dublin (IE); Patrick J. O'Sullivan, Dublin (IE); Hugh P Smyth, Dublin (IE); Mark E Wallace, Co Dublin (IE)

(73) Assignee: International Business Machines Corporation, Armonk, NY (US)

( * ) Notice: Subject to any disclaimer, the term of this patent is extended or adjusted under 35 U.S.C. 154(b) by 2073 days.

(21) Appl. No.: 10/714,018

(22) Filed: Nov. 14, 2003

(65) Prior Publication Data

US 2004/0268311 A1 Dec. 30, 2004

(30) Foreign Application Priority Data

Jun. 28, 2003 (GB) .................................. 0315193.3

(51) Int. Cl.
*G06F 9/45* (2006.01)
(52) U.S. Cl. ........ 717/136; 717/115; 717/124; 717/125; 717/126; 704/2; 704/8; 704/9
(58) Field of Classification Search .......... 717/124–139, 717/115
See application file for complete search history.

(56) References Cited

U.S. PATENT DOCUMENTS

| | | | | |
|---|---|---|---|---|
| 5,475,843 A | * | 12/1995 | Halviatti et al. | 717/124 |
| 5,583,761 A | * | 12/1996 | Chou | 715/201 |
| 6,167,534 A | * | 12/2000 | Straathof et al. | 714/38 |
| 6,629,087 B1 | * | 9/2003 | Benson et al. | 706/11 |
| 6,907,546 B1 | * | 6/2005 | Haswell et al. | 714/38 |
| 6,978,445 B2 | * | 12/2005 | Laane | 717/131 |
| 7,047,446 B1 | * | 5/2006 | Maurer et al. | 714/38 |
| 7,318,020 B1 | * | 1/2008 | Kim | 704/2 |
| 2002/0069263 A1 | * | 6/2002 | Sears et al. | 709/218 |

OTHER PUBLICATIONS

Cem Kaner, "Architectures of Test Automation", 2000.*
Barbour et al., "Internationalising a Spreadsheet for Pacific Basin Languages", 1997.*
O. Richard Fonorow, "Modeling Software Tools with Icon", 1988.*

* cited by examiner

*Primary Examiner* — Phillip Nguyen
(74) *Attorney, Agent, or Firm* — Raymond W. Szeto; Hoffman Warnick LLC (57) ABSTRACT

A system and method for language-neutral runtime user interface automation by: providing an automation script for automating use of the user interface in an application; intercepting a call from the automation script to a function simulating a user action on the application; retrieving a translated text string associated with the function call; and calling the function simulating the user action with the translated text string. This provides the advantages of not attaching any extra burden on the script developer and requiring little extra from the user (other than providing a native-language reference file).

18 Claims, 6 Drawing Sheets

FIG. 1

PRIOR ART

SYSTEM AND METHOD FOR USER INTERFACE AUTOMATION

BACKGROUND OF THE INVENTION

1. Technical Field

This invention relates to the general field of user interface automation, and particularly (though not exclusively) runtime graphical user interface automation.

2. Background Art

User interface automation involves the development of technical test scripts which will execute and which will allow an application to be navigated and tested in an automated way, i.e., with no user intervention. If the automation scripts are well written then errors/bugs will be automatically recorded so that an engineer can acknowledge and address these bugs when the automation scripts have run to completion. Once the bugs are fixed it is a common practice to execute the automation scripts again, thereby proving that the application being tested is bug free.

Automation scripts are commonly written so as to 1) significantly speed up the software testing process, 2) allow automation to run when engineers are away from the office (e.g., at night), and 3) develop test cases which are complete and comprehensive. Automation is therefore a useful tool/methodology for reducing costs of quality engineering and testing, as it speeds up the same activity that would otherwise be done manually.

One of the main problems/drawbacks with automation scripts is that they need to be heavily modified so as to execute on translated versions of an application (and it is common knowledge that testing on translated versions of the application accounts for over 80% of a corporation's worldwide testing effort). This process of modification (so that the automation can be run against translated versions of an application) is time consuming and error prone in a number of ways. Once the automation is developed it traditionally needs to be "re-engineered" to accommodate the characteristics of different language versions of the application. In particular, references that the automation makes to textual components on screen are invalid when the automation is executed on a translated version of the same application. Re-engineering implies fundamental structural changes to the automation to allow it to run on the translated versions of the application. Subsequent testing, revision and re-testing of the automation is also time consuming. Finally, when the automation is modified to cater for a subsequent version of the application (e.g. Version 2) the cycle of re-engineering, revision and re-testing needs to happen again. Therefore, the current industry methodology for developing automation results in a process which is time consuming and expensive when translated/language versions of the same application are considered. Because of this, few companies develop automation to run on translated versions of the application (i.e., it is generally written and designed for English versions of the application).

From U.S. Pat. No. 5,475,843 ('843 patent) there are known a system and methods for automated program testing which require predetermined, systematic and complex interception of the running application at run time. The level of interception is intrusive, and has the disadvantage of creating a high probability of compromising the natural execution of the application. In Quality Engineering terms, methods of automation are gauged on their effectiveness, and one measure is the level of interference for the running application being tested. The methods used in the '843 patent rely on an interception-based methodology or system, rather than allowing the application to run unhindered.

A second drawback to the methodology used in the '843 patent is that it cannot intercept and control the resolution and management of complex user interface control types (such as InfoBox panels in IBM® Notes™ and Smartsuite™ products, or a number of the more complex user interface classes in Sun Microsystems' J2EE™—Java™ 2 Platform, Enterprise Edition).

Further, in the '843 patent's methodology the application is centric, i.e., the interception of all application messages, events (keyboard, mouse, system), states, etc., is a pre-requisite to success. Such a model once again interferes with the natural execution of the application. This gives rise to quality and engineering considerations which can undermine the true value of the automation being run.

Finally, the methodology used in the '843 patent encourages a level of abstraction which can potentially take some degree of control from the script writer. In this regard the script writer is somewhat dependent on the methodology and characteristics of the '843 patent's interception and event handling engine. This limits the degree of control that the script writer can have in the '843 patent's natural test abstraction development methodology.

In summary, the '843 patent's automated testing solution behaves in a way which encourages interference and interception of the running application. The '843 patent relies on the specific interception of the running application to achieve its goals, and relies on the need to write ATUs (Application Translation Units).

A need therefore exists for a system and method for language-neutral runtime user interface automation wherein the abovementioned disadvantage(s) may be alleviated.

SUMMARY OF THE INVENTION

In accordance with a first aspect of the present invention there is provided a system for user interface automation, the system comprising: automation script means for receiving an automation script for automating use of the interface in an application; and script translation means for intercepting a call from the automation script to a function simulating a user action on the application, retrieving a translated text string associated with the function call, and calling the function simulating the user action with the translated text string.

In accordance with a second aspect of the present invention there is provided a method for user interface automation, the method comprising: providing an automation script for automating use of the user interface in an application; intercepting a call from the automation script to a function simulating a user action on the application; retrieving a translated text string associated with the function call; and calling the function simulating the user action with the translated text string.

In accordance with a third aspect of the present invention there is provided a computer program element comprising computer program means for: providing an automation script for automating use of the user interface in an application; intercepting a call from the automation script to a function simulating a user action on the application; retrieving a translated text string associated with the function call; and calling the function simulating the user action with the translated text string.

The present invention allows the above problems to be solved and provides a framework for a solution which will allow automation scripts to be developed once and re-used unmodified against translated versions of the same application.

In a preferred embodiment, the present invention allows run-time mapping of user interface components of an automation script using an original-language (e.g., English) automation script as the reference; this has great potential because it does not attach any extra burden on the script developer and requires little extra from the user—other than providing an English reference file.

BRIEF DESCRIPTION OF THE DRAWINGS

One system and method for language-neutral runtime user interface automation incorporating the present invention will now be described, by way of example only, with reference to the accompanying drawing(s), in which.

DETAILED DESCRIPTION OF THE INVENTION

A typical test automation tool provides the following features: scripting language which is used to describe the logic of the test case, e.g., including basic flow control semantics; a library of functions which will simulate user actions on the application graphical user interface, e.g., a button click; result reporting library which will record test script execution, passes and failures; and test script interpreter which will execute the test cases.

Figure 1:
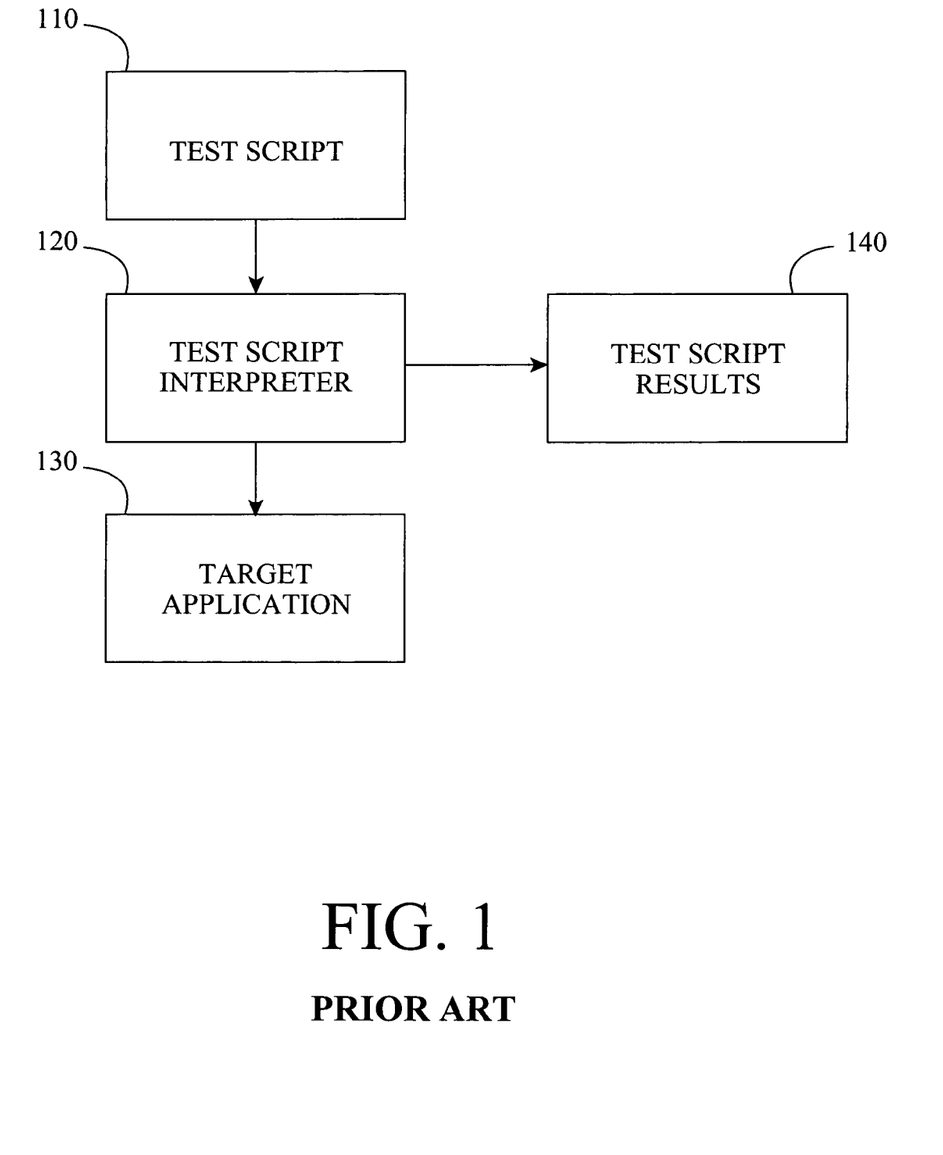
FIG. 1 shows a block schematic illustration of components involved in prior art execution of automated testing.

FIG. 1 illustrates the components involved in the execution of automated testing: a test script 110, a test script interpreter 120, a target application 130 and test script results 140

Figure 2:
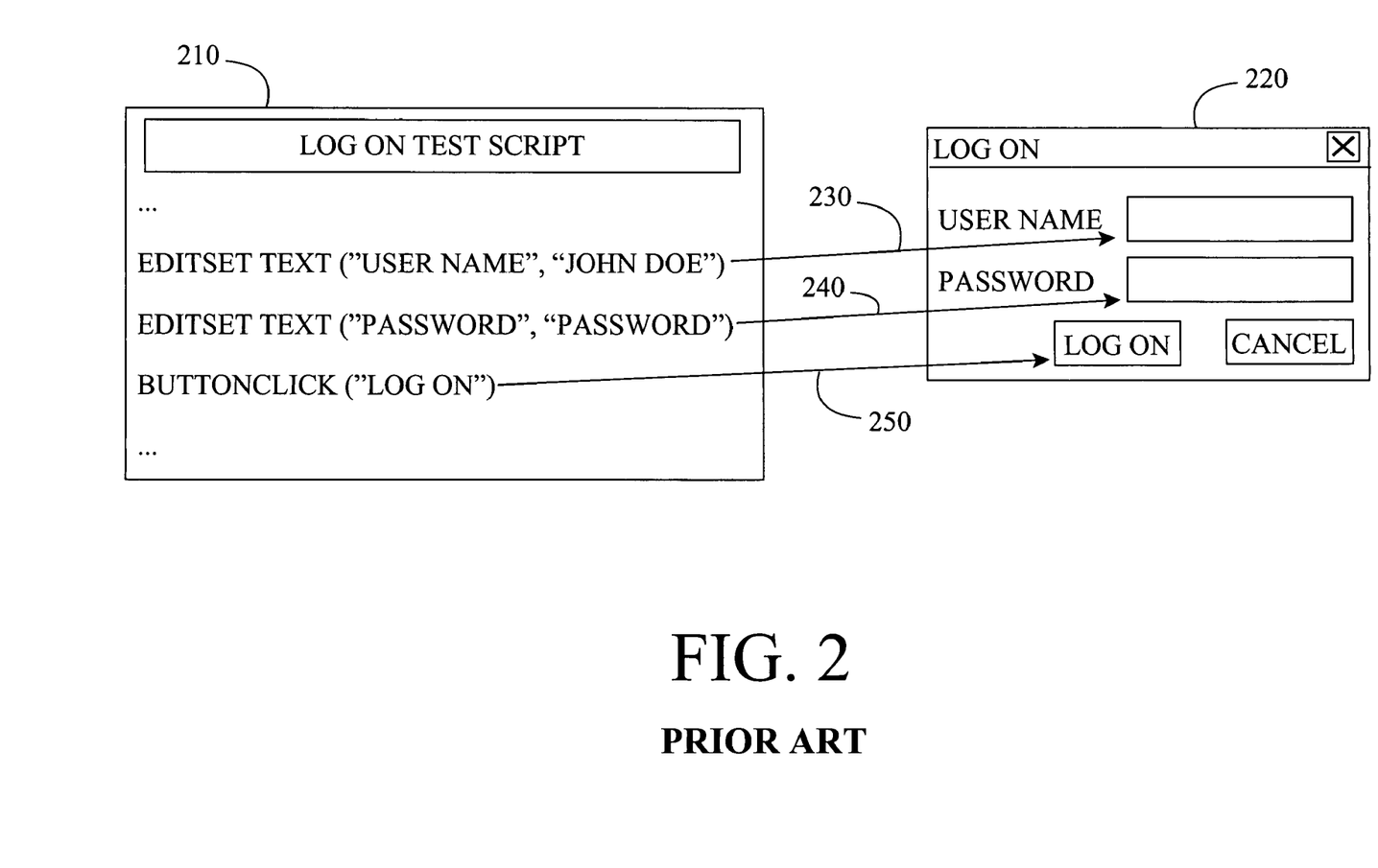
FIG. 2 shows a block schematic illustration of how steps of a 'Log On' Test Script relate to user interface elements in the method of FIG. 1.

In the following example a section of the test script such as 110 will log a user on. A pictorial illustration of such a test script section is shown in FIG. 2, in which the test script 210 is associated with an interactive 'Log On' dialog 220 displayed on a user display (not shown). The user interacts with the displayed dialog 220 by entry of text via a keyboard (not shown) and movement of a display pointer (not shown) and clicking of a selection device such as a mouse (not shown) in conventional manner. The script includes a line 'EditSet Text ("User name", "John Doe")' which is associated (as shown by arrow 230) with a 'User name' text input field in the dialog 220, a line 'EditSet Text ("Password", "password")' which is associated (as shown by arrow 240) with a 'Password' text input field in the dialog 220, and a line 'ButtonClick ("Log On")' which is associated (as shown by arrow 250) with a 'Log On' button (or a 'Cancel' button) in the dialog 220. To achieve the desired result, the user must enter the text 'John Doe' in the 'User name' field, must enter the text 'password' in the 'Password' field, and must click 'Log On' button.

A test tool provides functions that allow the automation of the manual user steps of: (1) selecting the 'User name' edit control; (2) typing a user's name; (3) selecting the 'Password' edit control; (4) typing a user's password; and (5) clicking the 'Log On' button.

In the above example the edit controls and button are identified by the text label associated with them, which would be intuitive for the test script author.

Figure 3:
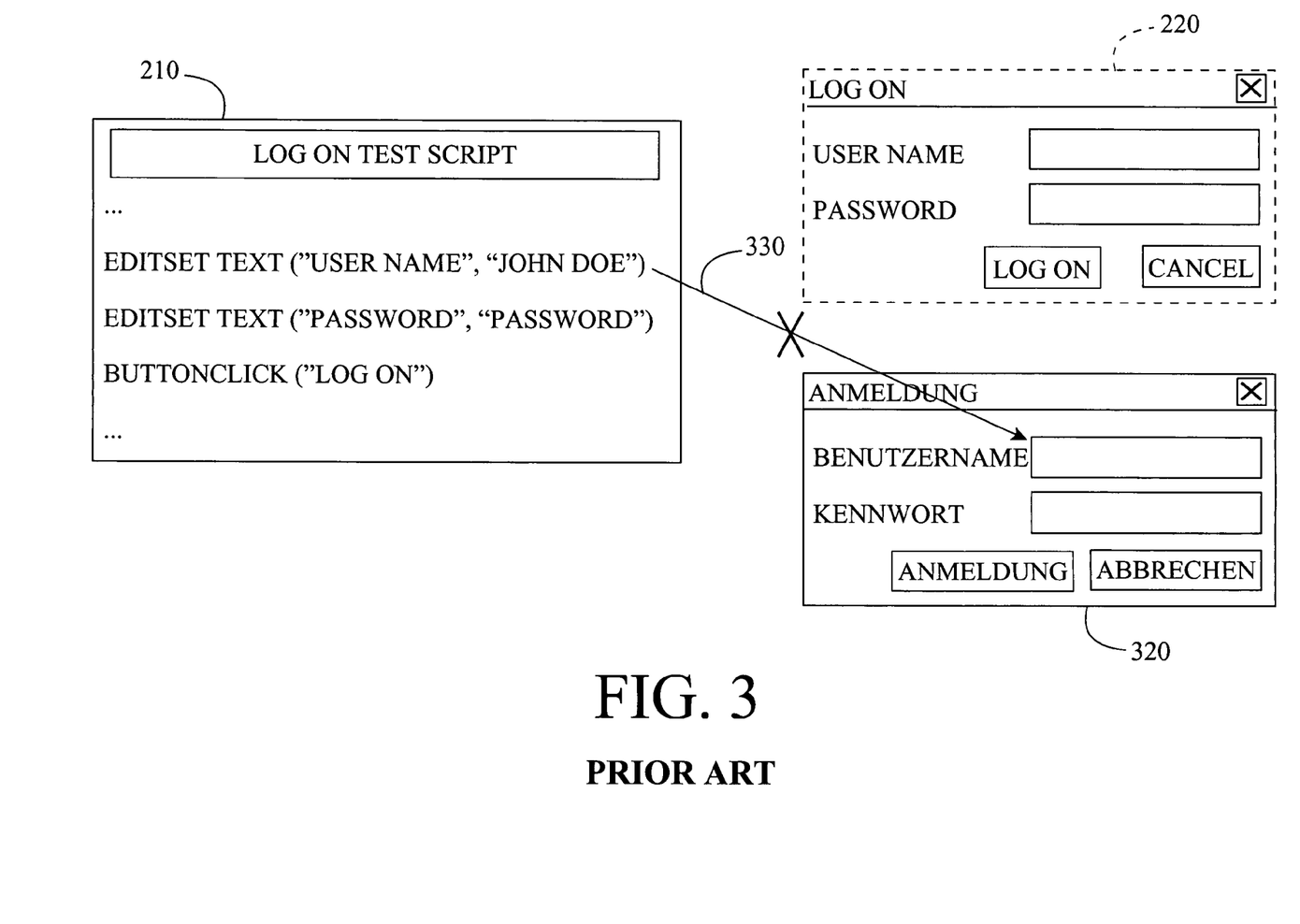
FIG. 3 shows a block schematic illustration of possible failure of the 'Log On' Test Script of FIG. 2 when the application to be tested is translated.

Now consider what happens when the application to be tested is translated (in this example into German), as shown in FIG. 3.

Because the text labels have been translated, the translated 'Anmeldung' dialog 320 (corresponding to the dialog 220, shown in this figure—for comparison only—by dashed line) is displayed to the user by the translated application. As shown, the translated 'Anmeldung' dialog 320 comprises a text input field labeled 'Benutzername', a text input field labeled 'Kennwort', and buttons labeled 'Anmeldung' and 'Abbrechen'. Consequently, it will be understood that the test script will fail (as indicated by the crossed arrow 330) at the first step 'EditSet Text ("User name", "John Doe")' described above and will report an error.

Figure 4:
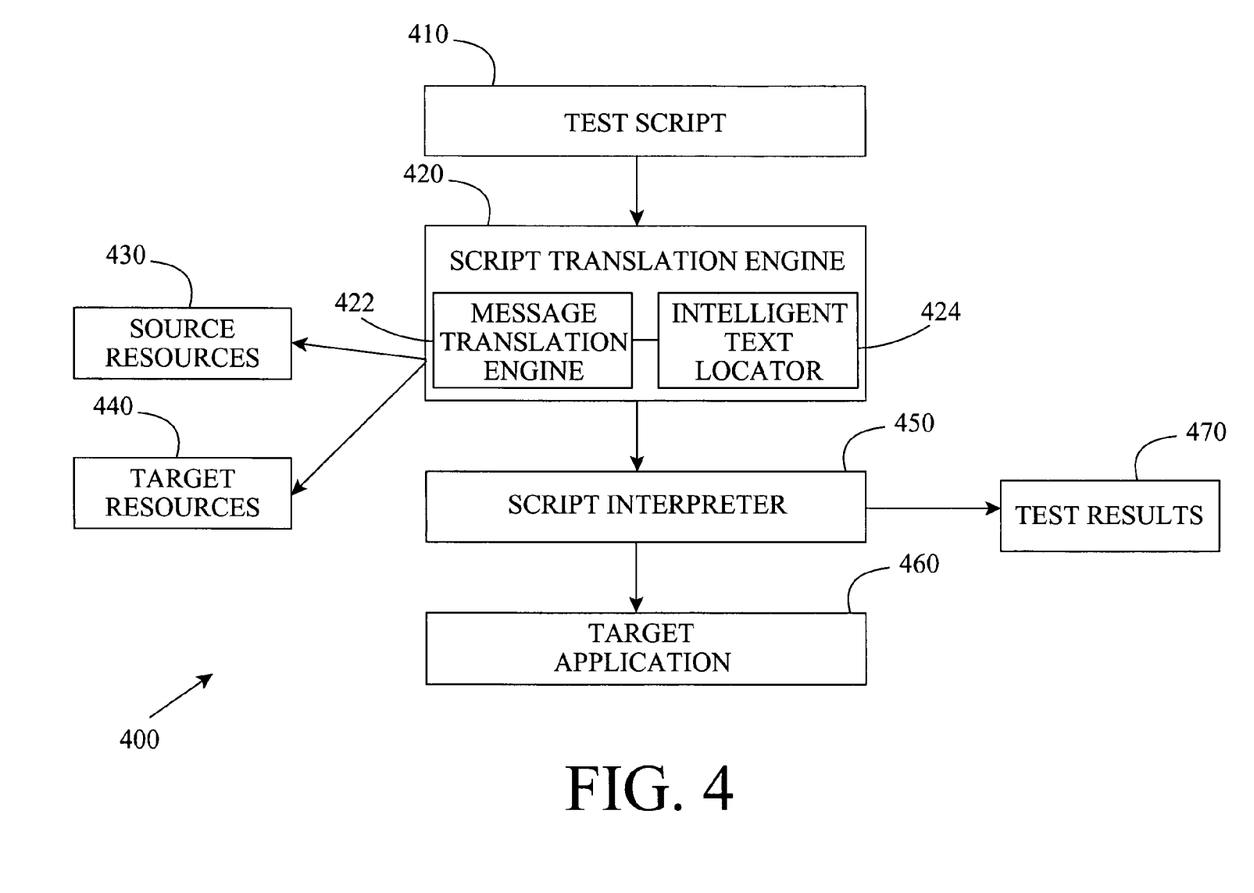
FIG. 4 shows a block schematic illustration of a test scheme, in accordance with a preferred embodiment of the present invention, in which translation difficulties are obviated.

To prevent the failure of the test script, the following testing scheme is employed to provide a mechanism to automatically translate the text string used to identify the control being manipulated. FIG. 4 illustrates the modified system 400 for the execution of test automation which takes into account the translation of the target application, i.e., the application being tested. As shown, the system 400 includes test script 410, script translation engine 420 (which will be described in greater detail below) and supporting libraries of source resources 430 and target resources 440, script interpreter 450, target application 460 and test results 470.

As will be described in greater detail below, the Script Translation Engine is a new component, which performs the following functions: intercept calls to functions which simulate user actions on the application, retrieve the resource identifier associated with the text string which identifies the target control, retrieve the translated string associated with the resource identifier, and call the original function which simulates the user action but with the translated string.

The Script Translation Engine 420 includes a Message Translation Engine (MTE) 422 which is responsible for supplying the translated text for the automation script's run time execution, and an Intelligent Text Locator (ITL) 424 which is responsible for selectively supplying the appropriate text to the automation script's run time execution. For example, the ITL 424 should not parse the externalized resources in a generic way. It should source these in the context of the instruction being applied. If the script engine is processing a button (e.g. 'press OK', 'press Cancel') then the ITL must provide the relevant dialog text. The MTE 422 differs from the ITL 424 in a number of ways, a key one of which is that the MTE could search for a translation to a textual object, but the search may get satisfied with an incorrect translation. This can typically happen when there are multiple instances of a textual object (i.e. a word or a sentence can appear in multiple places). It is the job of the ITL to ensure that during a search the correct translation is returned and that it respects the nature and type of control that the textual object belongs to—as opposed to simply taking the first match from the MTE.

When the call for a user action is intercepted the control type and translatable text must be identified. This can be inferred from the name of the function being called, e.g., 'ButtonClick' refers to push buttons, and the signature of the function (i.e., 'ButtonClick' takes a single argument which is the text label of the button to be clicked).

There are numerous examples of how the calls could be intercepted but the goal is to do this without requiring any test script alteration. For example, as shown in FIG. 5, this goal can be achieved by providing a library of functions which have the same signatures as the calling functions but which call the script translation engine before calling the underlying user action function from the test tool, then: either providing modified/renamed 'include' files which reference the script translation enabled library and having the test script reference that library, or naming the script translation enabled library with the same name as the test tool library and having the test script reference it (in this case, the script translation enabled library would still reference the original functions).

Figure 5:
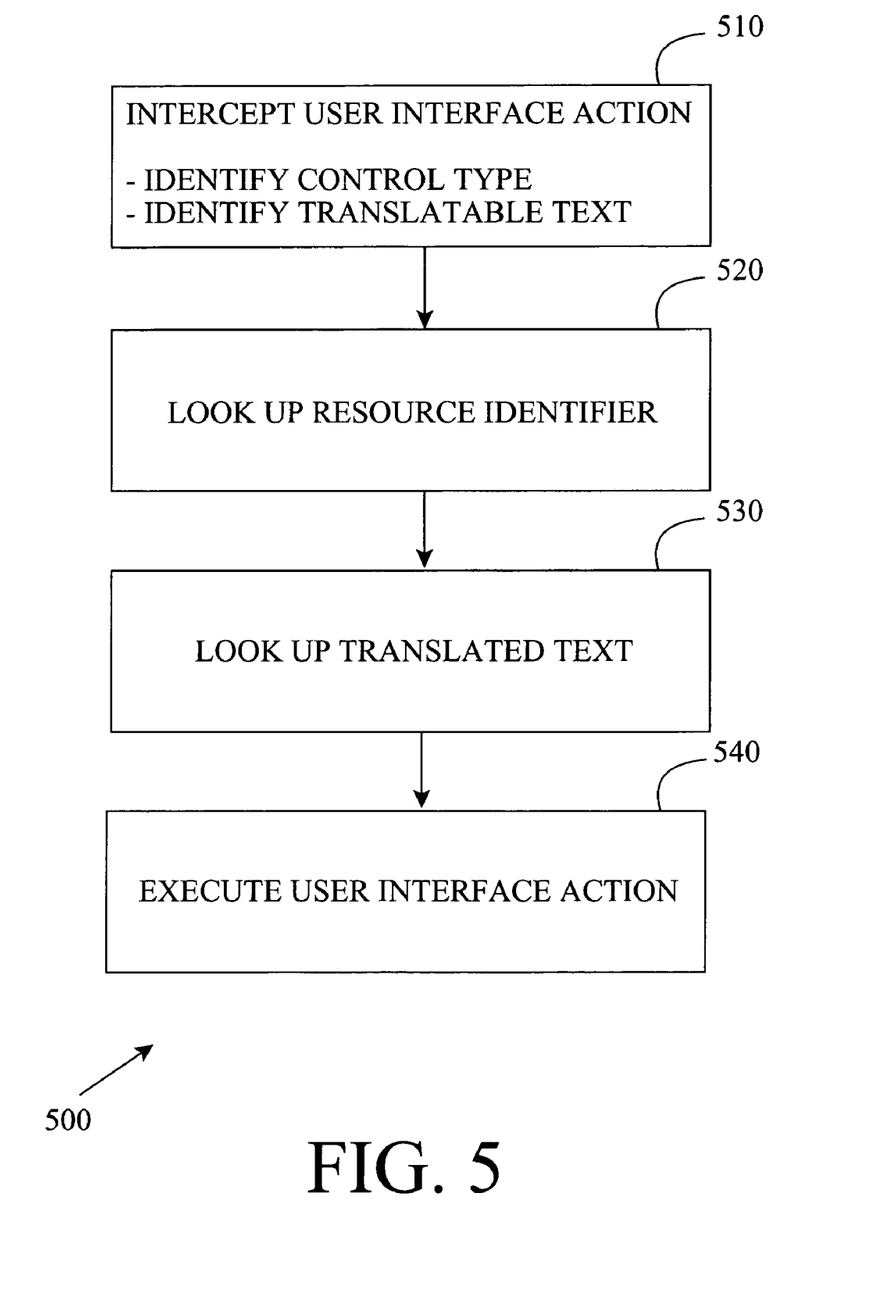
FIG. 5 shows a block schematic illustration of a possible sequence of steps for implementing intercept and execution of a user interface action in the test scheme of FIG. 4.

As shown in the FIG. 5, this process 500 of steps for implementing intercept and execution of a user interface action includes a first step 510 of intercepting the user interface action and identifying (i) the action's control type and (ii) its translatable text. At step 520 look up of the resource identifier is performed. At step 530 look up of the translated text is performed. Finally, at step 540 the user interface action is executed with the translated text.

Look up of the resource identifier uses the control type to allow for the case where the same text string is translated differently depending on context. The lookup can be implemented on the resource files or the compiled application binary files.

Look up of the translated text uses the resource ID. This will be a standard operation and can be executed on the compiled application binary files.

Figure 6:
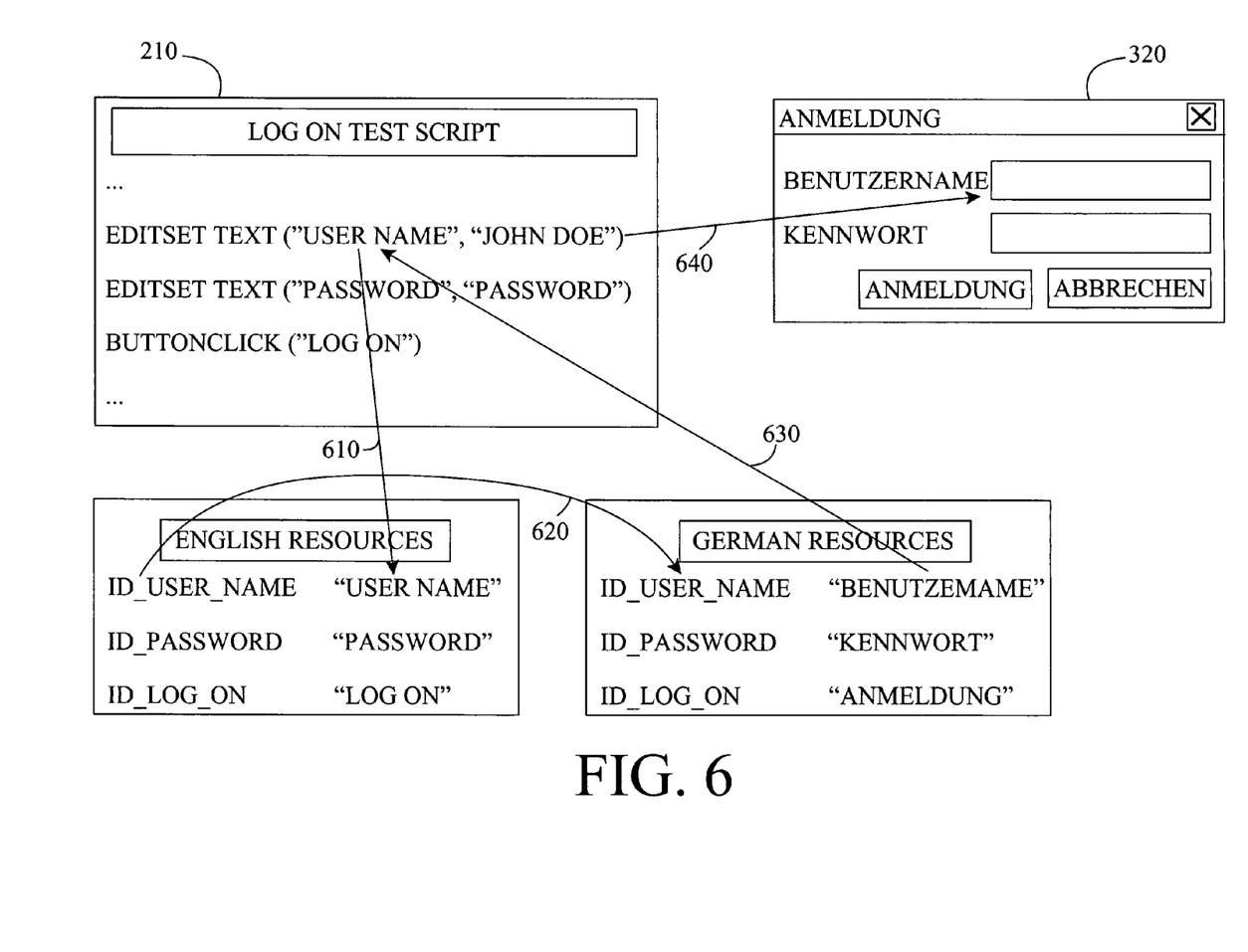
FIG. 6 shows a block schematic illustration of steps involved in the intercept and execution implementation of FIG. 5.

Thus, as shown in FIG. 6, the first line (for example) of script section 210 is performed under control of the script translation engine 420 as follows with respect to translated user dialog 'Anmeldung' 320: the script line 'EditSetText ("User name", "John Doe")' with causes the user action 'ID_USER_NAME "User name"' to be looked up (as indicated by arrow 610) in source (English) resources library 430; the entry (user action 'ID_USER_NAME "Benutzername"') with same resource ID is then looked up (as indicated by the arrow 620) in the target (German) resources library 440; and the user action 'ID_USER_NAME "Benutzername"' is then passed back (as indicated by the arrow 630) to the script 210, where it is associated (as indicated by the arrow 640) with the text entry field 'Benutzername' in the user dialog 320, resulting in successful completion of the source line in the script 210.

Thus, test execution in the modified system may be summarized as follows: the Script Translation Engine (STE) 420 uses the control type and text string to identify the resource identifier; the STE 420 then finds the equivalent resource in the translated version of the resources; the STE 420 substitutes the translated text string into the user action function; and the original user action function is called with the translated text.

It may be noted that if the translated text cannot be located, the test script will fail as previously described above in relation to FIG. 3. However, in this case the failure is valid, e.g., it could be that the version of the translated application differs from the one for which the test script was written.

It will therefore be appreciated that the modified automated test system described above is based on the two important features: (1) replacement of the default library of test functions (which simulate user actions) with a script translation enabled set of test functions, and (2) implementation of the script translation engine such that execution of an unmodified test script which will successfully run against a translated version of the application.

The sample code included in the following description is written in Java™ and uses features of the Java™ platform to illustrate a practical implementation of the key concepts. However, it will of course be understood that the present invention is not limited to such implementation, and may alternatively be implemented using a different programming language for a different platform.

Sample Test Script

Continuing from the example described above, only a subset of the test functions that would typically be provided are considered below, i.e., a function to simulate a user typing text in an editable text field, and a function to simulate a user clicking a button.

To simplify the example, a set of dummy test functions are provided which only output a text description of what the real test functions would do. These are implemented as static methods in a Java™ class as follows:

```
public class TestMethods {
    static public void EditSetText(String label, String text) {
        System.out.println("Type\"" + text +"\"in
        the \"" + label + "\" text edit field.");
    }
    static public void ButtonClick(String label) {
        System.out.println("Click the button \"" + label + "\".");
    }
}
```

An extract of a test script which uses these functions could look like this:

```
public class TestScript {
    public static void main(String[ ] args) {
        // test initialization
        // perform user log on
        TestMethods.EditSetText("User name", "John Doe");
        TestMethods.EditSetText("Password", "password");
        TestMethods.ButtonClick("Log On");
        // remainder of the test case
    }
}
```

This test script is run using this command-line (assuming environment is correctly configured):
  java TestScript
And the following output would be generated:
  Type "John Doe" in the "User name" text edit field.
  Type "password" in the "Password" text edit field.
  Click the button "Log On".

It is clear that the original English control labels are used to identify which editable text fields will have text entered and which button will be clicked. As described earlier this test script will fail when run against a translated version of the product.

Script Translation Enabled Test Methods

The original test function library needs to be shadowed by an alternative implementation of the test functions which are enabled for script translation. The preferred way to implement this is as follows: prevent the original test library from being loaded during test script execution, e.g., by renaming the library or changing its location; and make the script translation enabled version of the test functions available to be loaded. It is the responsibility of this implementation to ensure that the new functions can be used without any test script modification.

Continuing from the example started above, at runtime the test script will use the TestMethods class; to prevent it being loaded the class file is renamed from TestMethods.class to TestMethods.impl.

A script translation enabled version of the TestMethods class is provided. This implementation will: load the original implementation so the test functions can be called after script translation, and call the script translation engine to translate any text before calling the test function.

Loading the original implementation in Java™ requires the use of a class loader. This could be implemented as follows:

```
import java.io.FileInputStream;
public class TestMethodsClassLoader extends ClassLoader {
   Class loadTestMethods(String name) throws ClassNotFoundException {
      FileInputStream fi = null;
      try {
         String path = name.replace('.', '/');
         fi = new FileInputStream(path + ".impl");
         byte[ ] classBytes = new byte[fi.available( )];
         fi.read(classBytes);
         return defineClass(null, classBytes, 0, classBytes.length);
      }
      catch (Exception e) {
         // we could not find the class
         // so indicate the problem with an exception
         throw new ClassNotFoundException(name);
      }
      finally {
         if (null != fi) {
            try {
               fi.close( );
            }
            catch (Exception e) {
            }
         }
      }
   }
}
```

This implementation of a Java class loader simply loads the renamed file (i.e., 'TestMethods.impl') and then defines a new Java class from the loaded bytes. In the script translation engine enabled implementation of the TestMethods class this class loader is used as follows:

```
// load the script translation engine
scriptTranslationEngine = new ScriptTranslationEngine( );
// use a custom classloader to load the original implementation
TestMethodsClassLoader classLoader = new TestMethodsClassLoader( );
testMethods = classLoader.loadTestMethods("TestMethods");
editSetText = testMethods.getMethod("EditSetText", editSetTextArgs);
buttonClick = testMethods.getMethod("ButtonClick", buttonClickArgs);
```

The renamed class file is loaded and references to the original test functions can be created and saved for later use. An instance of the script translation engine is also loaded and saved for later use.

The script translation enabled test function would look like this:

```
static public void EditSetText(String label, String text) {
   try {
      label = scriptTranslationEngine.getTranslatedText("EDIT", label);
      Object[ ] args = new Object[ ] { label, text };
      editSetText.invoke(null, args);
   }
   catch (Exception e) {
   }
}
```

Before calling the original test function the script translation engine is first called to get the translated text.

Script Translation Engine

The script translation engine implements the following features: load the resource files for the version of the application for which the test script was written and on which the test script is to be executed; build a lookup table for resolving resource identifiers from resource strings and control types; and perform lookups to get the translated text from a resource string and control type.

In Java™ the resource files are typically implemented as property bundles (text files containing resource identifier and resource values name/value pairs). This implementation below assumes the names of the source (the version for which the test script was written) and target (the version on which the test script will be run) resource files names are specified as parameters to the Java™ runtime library. Other runtime libraries will provide a mechanism to allow configuration settings to be configured from an external source, e.g., '.ini' files.

```
// resource files to be used for this test run
String sourceFile = System.getProperty("source_file");
String targetFile = System.getProperty("target_file");
// if they are the same or not specified then no translation is required
if (sourceFile == null || sourceFile.equals(targetFile)) return;
// load the language files
sourceBundle = ResourceBundle.getBundle(sourceFile);
targetBundle = ResourceBundle.getBundle(targetFile);
```

The lookup table uses the source resource strings as keys and the resource identifiers as values. In the case where the same string has multiple resource identifiers then all of them will be saved.

```
// populate the resource id lookup table with all resource values
// using the resource strings as the keys and the resource ids as the
// values. if a resource string has multiple resource ids then all of
// the values are stored in a Vector.
for (Enumeration e = sourceBundle.getKeys( ); e.hasMoreElements( );) {
   String key = e.nextElement( ).toString( );
   String val = sourceBundle.getString(key.toString( ));
   if (resourceIdLookup.containsKey(val)) {
      Object keyObject = resourceIdLookup.get(val);
      Vector vals = null;
      if (keyObject instanceof Vector) {
         vals = (Vector) keyObject;
      }
      else {
         vals = new Vector( );
         vals.add(keyObject);
      }
      vals.add(key);
      resourceIdLookup.put(val, vals);
   }
   else {
      resourceIdLookup.put(val, key);
   }
}
```

Lookups require the control type and also the resource string to be specified. The example below demonstrates one strategy for resolving a resource ID where there are multiple resource IDs for a single string. This is important because in the translated version of the resource file the string could be translated in two different ways depending on context.

```
String getTranslatedText(String control, String text) {
   if (resourceIdLookup.containsKey(text)) {
      Object key = resourceIdLookup.get(text);
      if (key instanceof Vector) {
```

-continued

```
   // simple strategy for finding the correct resource id
   // is to assume the id starts with the control type
   for (Enumeration e = ((Vector)key).elements( );
   e.hasMoreElements( );) {
      String nextKey = e.nextElement( ).toString( );
      if (nextKey.toString( ).startsWith(control)) {
         text = targetBundle.getString(nextKey);
         break;
      }
   }
}
else {
   text = targetBundle.getString(key.toString( ));
}
}
return text;
}
```

Sample Translated Test Script

To run the previous test script with script translation enabled the following command-line is used (assume environment is correctly configured):

java-Dsource_file=resources_en-Dtarget_file=resources_de TestScript

The following files need to be available on the local file system: (1) 'resources_en.properties'—the English version of the application resources; (2) 'resources_de.properties'—the German version of the application resources; (3) 'TestMethods.impl'—the original implementation of the test functions.

And the following output would be generated:

Type "John Doe" in the "Benutzemame" text edit field.
Type "password" in the "Kennwort" text edit field.
Click the button "Anmeldung".

Thus, it will be understood that the novel scheme described above provides a method for overriding relevant Automation Script APIs (Application Programming Interfaces) which is easy to install/uninstall/integrate with an automation test tool, which allows Fast Resource lookup, 'write once read many' functionality, and easy subclassing of automation functions. It allows interception of selected runtime methods (of the automation environment) to perform translation on the fly of their parameters and subsequent calling of the native, unmodified automation environment methods with the translated parameters. Also, it permits runtime lookup of the original tested application translated resources, i.e., the same ones used by the tested application. It also allows fast resource lookup, resource lookup across multiple resource files in multiple directories, and resource lookup for partial strings. Also, it readily permits a log file of activity to be created.

It will be understood that the system and method described above provides language-neutral runtime user interface automation offering the following advantages:

(1) run-time mapping of the user interface components of the automation script using the original English automation script as the reference. This has great potential because it does not attach any extra burden on the script developer and requires little extra from the user—other that providing the English reference file.

(2) Non interception methodology when compared with the prior art U.S. Pat. No. 5,475,843.

(3) Speed—as the methodology in this idea incorporates a non-interference directive the application is allowed to execute in an unhindered way. It is common knowledge that interception based methodologies have the side effect of slowing down the running application.

(4) Less complexity for Script Writer, i.e., the script writer can write the automation script and in so doing is not concerned with designing the script to accommodate language/translated characteristics.

(5) Supports a level of cooperation from the application with regard to proprietary custom controls, i.e., respects proprietary controls and provides an accessibility methodology based on what the application exposes by way of its application programming interface (API) and user interface (UI).

(6) Is automation centric in that the automation is seen as the driver of the application's natural execution. In the methodology of the prior art U.S. Pat. No. 5,475,843 the application is centric, in that the interception of all application messages, events (keyboard, mouse, system), states, etc., is a pre-requisite to success. This prior art methodology can be considered a flawed model as once again it interferes with the natural execution of the application. This gives rise to quality and engineering considerations which can undermine the true value of the automation being run.

(7) The methodology used in the prior art U.S. Pat. No. 5,475,843 encourages a level of abstraction which can potentially take some degree of control from the script writer. In this regard the script writer is somewhat dependent on the methodology and characteristics of the prior art patent's interception and event handling engine. This limits the degree of control that the script writer can have in the prior art patent's natural test abstraction development methodology. The novel scheme described above assumes a non-interference directive, and therefore looks to a cooperating application to achieve the test automation goals. This can be seen as a key difference: the novel scheme described above supports non-interference, while the prior art patent relies on interference. In summary, the prior art patent's solution solves a similar class of problem to that of the novel scheme described above, but in a way which encourages interference and interception of the running application. In contrast, the novel scheme described above protects the application's natural run-time execution, i.e., during the application's run time a language setting decides what language is being tested, and the script writer's additional effort is minimized in supporting the run-time testing of this localized application. Also, the novel scheme described above simply takes the localized components of existing translated applications and seamlessly makes these available during the script's run time—therefore not depending on a database. The novel scheme described above may be considered as effectively subclassing the script to allow a language-neutral execution of the script. This differs to the prior art patent's solution which relies on the specific interception of the running application to achieve its goals. Therefore the need to write ATUs (as seen in the prior art patent) is unnecessary in the methodology of the novel scheme described above.

(8) Test script is written once and re-used across all languages.

(9) No need to translate the test script to run on translated products or applications.

(10) No test script modifications required when running on different language versions.

(11) Solution is independent from the target control type implementations (i.e., the automation environment is left unmodified to deal with those aspects), platforms, technologies, etc.

(12) Can be applied to various automation environments independently of them.

(13) No additional effect on the runtime environment of the tested application compared to the same automation running without the novel scheme described above.

It will be appreciated that the method described above for language-neutral automation of test scripts will typically be carried out in software running on a processor (not shown) within the system, and that the software may be provided as a computer program element carried on any suitable data carrier (also not shown) such as a magnetic or optical computer disc.

It will be understood and appreciated that alternatives to the aspects of the novel scheme described above will be apparent to a person of ordinary skill in the art, without departing from the underlying inventive concept. For example, although the novel scheme has been described in the context of a graphical user interface, it will be appreciated that the invention may be employed in the context an alternative user interface such as a text user interface.

What is claimed is:

1. A system for language-neutral user interface automation, the system comprising:
   a system executing a test, the system executing the test including a processor; and
   a memory, the memory including program code which, when executed, performs a method comprising:
      receiving an automation script for automating use of the user interface in a system under test by the system executing the test, wherein the system under test includes an application and wherein the interface may be in an arbitrary natural language; and
      intercepting a call from the automation script to a function simulating a user action on the application, wherein the interception includes accessing a database or file system that is independent from the system under test so that the application's natural run-time execution is protected before, during and after the functional automation executes, retrieving a translated text string associated with the function call, and calling the function simulating the user action with the translated text string;
      wherein the translation consists of converting to or from a first natural language to a second natural language.

2. The system of claim 1, wherein the intercepting includes:
   supplying translated text for the automation script's run time execution; and
   selectively supplying appropriately translated text to the automation script's run time execution depending on the function call in a case that a same text string is translated differently based on context.

3. The system of claim 2, wherein the selectively supplying appropriately translated text includes selectively supplying appropriate text to the automation script's run time execution depending on a resource ID of the function call.

4. The system of claim 1, wherein the intercepting uses
   a library including a function having a same signature as the function call and which is arranged to retrieve the translated text string before the function call; and
   one of:
      a file referencing the library, the automation script being arranged to reference the file and the library, or
      the library including the retrieval function and the function call, the library being arranged to be called by the automation script.

5. The system of claim 4, wherein the file referencing the library comprises an include file.

6. The system of claim 4, wherein the library including the retrieval function and the function call has the same name as a library containing the function called by the automation script.

7. The system of claim 1, wherein the automation script is in the English language and the application is arranged to use a non-English language.

8. The system of claim 1, wherein the user interface comprises a graphical user interface.

9. A method for language-neutral user interface automation, the method comprising:
   providing an automation script for automating use of the user interface in a system under test by a system executing the test, wherein the system under test includes an application and wherein the interface may be in an arbitrary natural language;
   intercepting a call from the automation script to a function simulating a user action on the application; wherein the interception is performed by the system executing the test and includes accessing a database or file system that is independent from the system under test so that the application's natural run-time execution is protected before, during and after the functional automation executes,
   retrieving a translated text string associated with the function call; wherein the translated text string has been converted to or from a first natural language to a second natural language; and
   calling the function simulating the user action with the translated text string.

10. The method of claim 9, further comprising:
    supplying translated text for the automation script's run time execution;
    wherein the step of retrieving comprises selectively supplying appropriately translated text to the automation script's run time execution depending on the function call in a case that a same text string is translated differently based on context.

11. The method of claim 10, wherein the selectively supplying appropriately translated text includes selectively supplying appropriate text to the automation script's run time execution depending on a resource ID of the function call.

12. The method of claim 9, wherein the intercepting uses
    a library including a function having a same signature as the function call and which is called to retrieve the translated text string before the function call; and
    one of:
       a file referencing the library, the automation script referencing the file and the library, or
       the library including the retrieval function and the function call, the library being called by the automation script.

13. The method of claim 12, wherein the file referencing the library comprises an include file.

14. The method of claim 12, wherein the library including the retrieval function and the function call has the same name as a library containing the function called by the automation script.

15. The method of claim 9, wherein the automation script uses the English language and the application uses a non-English language.

16. The method of claim 9, wherein the user interface comprises a graphical user interface.

17. A program product stored on a non-transitory computer readable medium, for language-neutral user interface automation, which when executed, performs a method comprising:

providing an automation script for automating use of the user interface in a system under test by a system executing the test, wherein the system under test includes an application and wherein the interface may be in an arbitrary natural language;

intercepting a call from the automation script to a function simulating a user action on the application; wherein the interception is performed by the system executing the test and includes accessing a database or file system that is independent from the system under test so that the application's natural run-time execution is protected before, during and after the functional automation executes;

retrieving a translated text string associated with the function call;

wherein the translated text string has been converted to or from a first natural language to a second natural language; and calling the function simulating the user action with the translated text string.

18. The program product of claim 17, wherein the method further comprising:

supplying translated text for the automation script's run time execution;

wherein the step of retrieving comprises selectively supplying appropriately translated text to the automation script's run time execution depending on the function call in a case that a same text String is translated differently based on context.

* * * * *